US008525079B2

(12) United States Patent
Weiss

(10) Patent No.: US 8,525,079 B2
(45) Date of Patent: Sep. 3, 2013

(54) FLAT HEATING ELEMENT

(75) Inventor: Michael Weiss, Benediktbeuern (DE)

(73) Assignee: W.E.T. Automotive Systems AG, Odelzhausen (DE)

( * ) Notice: Subject to any disclaimer, the term of this patent is extended or adjusted under 35 U.S.C. 154(b) by 76 days.

(21) Appl. No.: 13/204,152

(22) Filed: Aug. 5, 2011

(65) Prior Publication Data

US 2012/0018414 A1 Jan. 26, 2012

Related U.S. Application Data

(63) Continuation of application No. 12/096,266, filed as application No. PCT/DE2006/002199 on Dec. 11, 2006, now Pat. No. 8,253,071.

(51) Int. Cl.
*B60L 1/02* (2006.01)
*H05B 3/10* (2006.01)

(52) U.S. Cl.
USPC ........... 219/202; 219/203; 219/211; 219/212; 219/528; 219/529; 219/541; 219/542; 219/543; 219/552; 219/553

(58) Field of Classification Search
USPC ............... 219/202–3, 211–12, 528–9, 541–3, 219/552–3
See application file for complete search history.

(56) References Cited

U.S. PATENT DOCUMENTS

| | | | |
|---|---|---|---|
| 4,845,343 | A | 7/1989 | Aune et al. |
| 4,964,674 | A | 10/1990 | Altmann et al. |
| 5,045,673 | A | 9/1991 | Kelly |
| 5,824,996 | A | 10/1998 | Kochman et al. |
| 5,921,314 | A | 7/1999 | Schuller et al. |
| 6,057,530 | A | 5/2000 | Gurevich |
| 6,064,037 | A | 5/2000 | Weiss et al. |
| 6,147,332 | A | 11/2000 | Holmberg et al. |
| 6,150,642 | A | 11/2000 | Weiss et al. |
| 6,164,719 | A | 12/2000 | Rauh |
| 6,229,123 | B1 | 5/2001 | Kochman et al. |
| 6,294,758 | B1 | 9/2001 | Masao et al. |
| 6,369,369 | B2 | 4/2002 | Kochman et al. |
| 6,415,501 | B1 | 7/2002 | Schlesselman et al. |
| 6,439,658 | B1 | 8/2002 | Ganz et al. |
| 6,452,138 | B1 | 9/2002 | Kochman et al. |

(Continued)

FOREIGN PATENT DOCUMENTS

| | | |
|---|---|---|
| DE | 3513909 | 10/1986 |
| DE | 3832342 C1 | 7/1989 |

(Continued)

OTHER PUBLICATIONS

Written Opinion of the International Searching Authority Application No. PCI/DE2006/002199.

(Continued)

*Primary Examiner* — Shawntina Fuqua

(74) *Attorney, Agent, or Firm* — The Dobrusin Law Firm, P.C.

(57) ABSTRACT

This invention relates to a flat heating element in particular for heating surfaces in contact with the user in the passenger compartment of a vehicle, comprising at least one electrical conductor. According to the invention, the electrical conductivity of at least one of these electrical conductors is at least temporarily reduced if the temperature thereof at least locally exceeds a permissible maximum temperature.

20 Claims, 3 Drawing Sheets

(56) References Cited

U.S. PATENT DOCUMENTS

Figure 1:
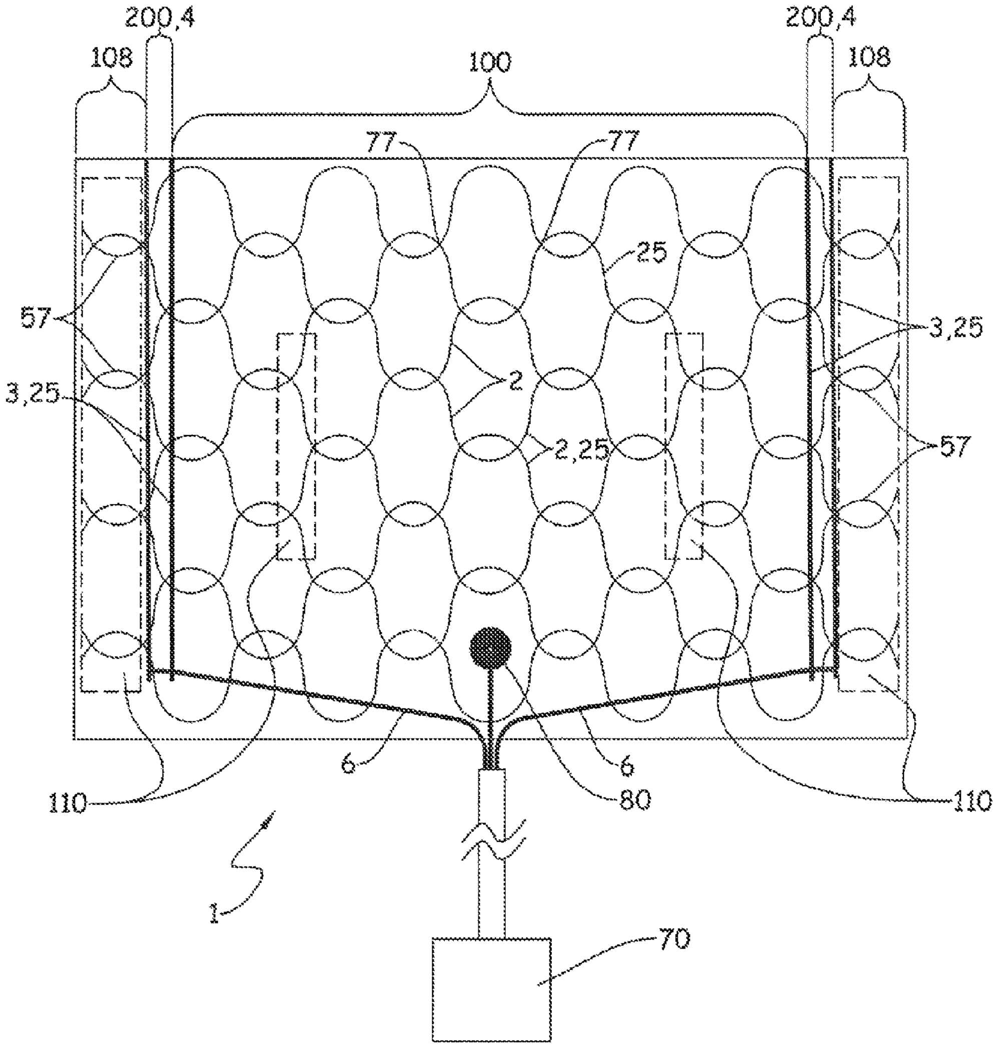

| | | | |
|---|---|---|---|
| 6,501,055 | B2 | 12/2002 | Rock et al. |
| 6,604,426 | B2 | 8/2003 | Kraetzl |
| 6,619,736 | B2 | 9/2003 | Stowe et al. |
| 6,629,724 | B2 | 10/2003 | Ekern et al. |
| 6,664,512 | B2 | 12/2003 | Horey et al. |
| 6,676,207 | B2 | 1/2004 | Rauh et al. |
| 6,686,562 | B1 | 2/2004 | Weiss et al. |
| 6,710,303 | B1 | 3/2004 | Lorenzen |
| 6,713,733 | B2 | 3/2004 | Kochman et al. |
| 6,786,541 | B2 | 9/2004 | Haupt et al. |
| 6,838,647 | B2 | 1/2005 | Nagele |
| 6,840,576 | B2 | 1/2005 | Ekern et al. |
| 6,857,697 | B2 | 2/2005 | Brennan et al. |
| 6,869,139 | B2 | 3/2005 | Brennan et al. |
| 6,869,140 | B2 | 3/2005 | White et al. |
| 6,893,086 | B2 | 5/2005 | Bajic et al. |
| 7,205,510 | B2 | 4/2007 | Howick |
| 7,560,670 | B2 | 7/2009 | Lorenzen et al. |
| 2003/0047548 | A1 | 3/2003 | Horey et al. |
| 2003/0047549 | A1* | 3/2003 | Horey et al. .................. 219/212 |
| 2004/0169028 | A1 | 9/2004 | Hadzizukic et al. |
| 2004/0189061 | A1 | 9/2004 | Hartwich et al. |
| 2005/0066505 | A1 | 3/2005 | Iqbal et al. |
| 2005/0067401 | A1 | 3/2005 | Fernandez et al. |
| 2005/0067862 | A1 | 3/2005 | Iqbal et al. |
| 2005/0085968 | A1 | 4/2005 | Panic |
| 2005/0093347 | A1 | 5/2005 | Bajic et al. |
| 2005/0127723 | A1 | 6/2005 | Bajic et al. |
| 2005/0140189 | A1 | 6/2005 | Bajic et al. |
| 2005/0161986 | A1 | 7/2005 | Brennan et al. |
| 2005/0173950 | A1 | 8/2005 | Bajic et al. |
| 2007/0257027 | A1 | 11/2007 | Krobok |
| 2007/0278210 | A1 | 12/2007 | Weiss |
| 2007/0278214 | A1 | 12/2007 | Weiss et al. |
| 2008/0010815 | A1 | 1/2008 | Bajic et al. |
| 2008/0047733 | A1 | 2/2008 | Axakov et al. |

FOREIGN PATENT DOCUMENTS

| | | | |
|---|---|---|---|
| DE | 4101290 | A1 | 7/1992 |
| DE | 19638372 | A1 | 3/1997 |
| DE | 10206336 | A1 | 9/2003 |
| DE | 202004011968 | U1 | 11/2004 |
| DE | 202005008878 | U1 | 10/2006 |
| FR | 2301989 | A1 | 9/1976 |
| FR | 2336901 | A1 | 7/1977 |
| JP | 2001-217058 | A | 8/2001 |
| WO | 94/09684 | A1 | 5/1994 |
| WO | 2005/089031 | A1 | 9/2005 |

OTHER PUBLICATIONS

International Preliminary Report on Patentability, Application No. PCT/DE2006/002199, Dated Jul. 8, 2008.

International Search Report, Published as WO2007/065424A3, Dated Jun. 14, 2007.

Co-pending U.S. Appl. No. 12/447,998, filed Apr. 30, 2009.

Co-pending U.S. Appl. No. 12/233,649, filed Dec. 12, 2008.

* cited by examiner

FLAT HEATING ELEMENT

CLAIM OF PRIORITY

This application is a continuation of copending U.S. application Ser. No. 12/096,266, filed Jun. 5, 2008, which in turn claims priority of the filing date of PCT Application Serial No. PCT/DE2006/002199, filed Dec. 11, 2006 and to German Application Serial No. DE 102005059496.4, filed Dec. 11, 2005, the contents of which are hereby incorporated by reference in their entirety.

This invention relates to a flat heating element according to the preamble of claim 1, in particular for heating surfaces in contact with the user in the passenger compartment of a vehicle.

PRIOR ART

DE 41 01 290: It is known practice to contact a plurality of heating conductors with a plurality of contact conductors in order to create redundancy for the event of failure of individual conductors. However, there are certain applications in which such heating elements have to meet particularly stringent safety and sturdiness requirements.

Commercially available products: It is known practice to silver-plate copper conductors in order to protect them against corrosion. However, unless the silver coating is impervious, the copper is still susceptible to attack. Moreover, the silver diffuses with time into the copper. This results in the formation of a boundary layer comprising a Ag—Cu alloy, which is extremely brittle. Fractures in this boundary layer form incipient cracks that likewise endanger the conductor.

DE 3832342 C1, DE 19638372 A1, DE 10206336 A1: It is known practice to use jacketed wires. In this case, electrical conductors are provided with a core of steel or precious metal and with a jacket of copper or platinum. The core may be tuned to meet criteria such as flexibility, tear and tensile strength and reversed-bending strength, while the jacket may be optimized with respect to the desired electrical properties. Jacketed wires of this kind are relatively expensive, however, and show only limited corrosion resistance.

2001-217058: It is known practice to sheath a heating conductor consisting of a pluraiity of carbon fibers with heat-shrinkable tubing. However, an assembly of this kind is not very fracture-proof, DE2020040011968: it is known practice to provide a heating conductor with three different coatings. The intention here is for leakage currents between different layers, signalizing a heating-eiement malfunction, to be detected by a monitoring means. Multiple coatings of this kind make production more complicated, and the monitoring electronics are expensive.

WO 2005/089031: Heating elements featuring metal-clad polymer conductors are known. The intention here is to develop these further for additional applications.

SUBJECT OF THE INVENTION

One aim of this invention consists in manufacturing a heating element that shows sufficient fatigue and corrosion resistance, can be produced cost-efficiently and, in the event of a malfunction, becomes inoperative without impairing its surroundings. This is achieved with the subject matter of claim 1.

Another aim consists in manufacturing a seat that can be efficiently temperature-controlled and that is also safe during continuous service. This is achieved with the subject matter of claim 4. Additional advantageous embodiments that are contemplated are evident from the remaining claims and the description.

DRAWINGS

Details of the invention are explained in the following, with reference being made to:

FIG. 1 a top view of a flat heating element

Figure 2:
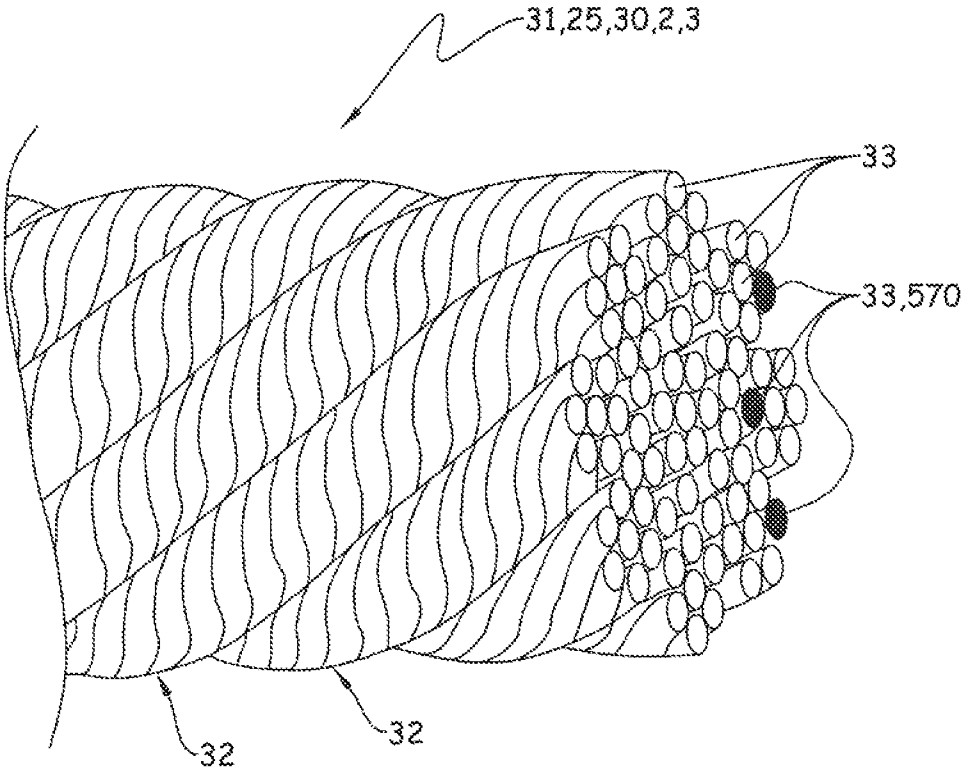

FIG. 2 enlarged view of a conductor in the heating element shown in FIG. 1

Figure 3:
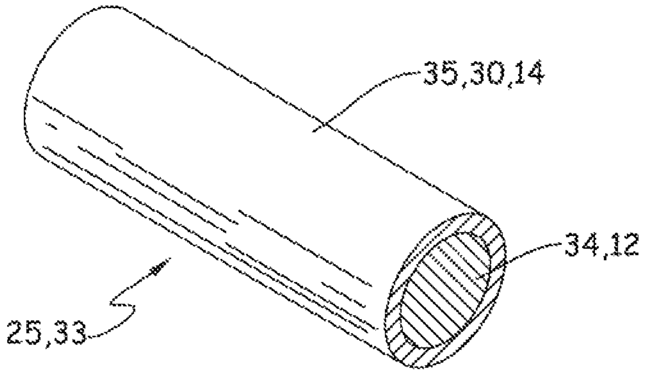

FIG. 3 enlarged view of an individual strand of the conductor shown in FIG. 2

Figure 4:
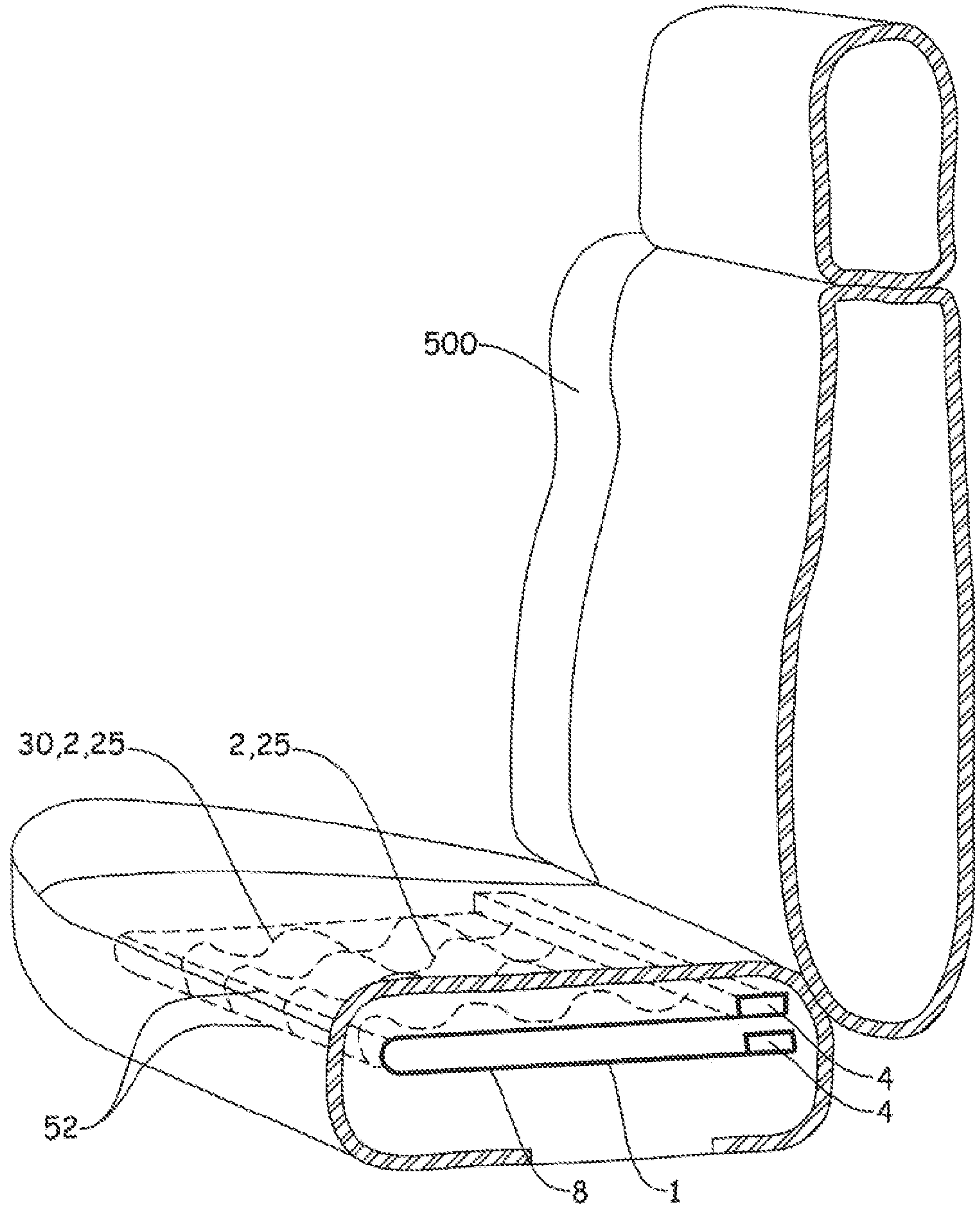

FIG. 4 perspective section through a seat featuring the heating element of FIG. 1

DESCRIPTION OF THE INVENTION

Heating element 1: FIG. 1 shows a flat, electric heating element 1.

Flat element support 8: The heating element 1 features at least one flat element support 8. It may be advantageous for at least one of the element supports 8 to be made up, at least partially, of a textile, a multiple- or single-thread knitted fabric, a woven or non-woven fabric, a flexible thermoplastic, an air-permeable material, and/or a film. In the embodiment, an element support 8 featuring a non-woven fabric of synthetic fibers is provided.

Heating zone 100: Provision is made for the heating element 1 to have at least one heating zone 100. This is assigned to a surface to be heated, or forms this itself.

Heating conductor 2: The heating element 1 features, in particular, at least one heating conductor 2 located in contact with and/or in the heating zone 100. It is preferable to provide a plurality of heating conductors, which preferably meander beside one another and are connected up in parallel. In the embodiment, each heating conductor is located at an average distance of about 2 cm from the next heating conductor, and runs approximately parallel thereto.

High-resistance heating conductor: At least one of the heating conductors 2 has an electrical resistance between 100 Ω/m and 1000 Ω/m, preferably between 100 and 800 Ω/m, preferably between 300 and 500 Ω/m. In the embodiment, all the heating conductors 2 have a resistance of approximately 300 Ω/m.

Interlinked heating conductors: Provision is made for at least some of the heating conductors 2 to be interlinked. This is achieved by arranging for the ends 57 of at least some of the heating conductors 2 to be interconnected, some of them electrically, at contact locations 77. As a result, localized heating-conductor malfunctions caused, for example, by damage during sewing or by vandalism, do not disrupt the operation of the heating element because in the event of a localized failure of individual heating conductors, the heating current is distributed to neighboring heating conductors. Moreover, by virtue of the interlinking, an impermissibly high current load will immediately damage all the heating conductors 2 and rapidly render the heating element inoperative in the event of a fault.

Limited current load: Provision is made for the regular current load per heating conductor 2 to be essentially less than 100 mA at an operating voltage of between 10 and 50 V. This is important in order to prevent localized overheating in the direct vicinity of a heating conductor. It should be remembered in this context that the temperature in the direct vicinity of a heating conductor is usually distinctly higher than the average temperature of the heated surface as measured by a thermostat in the heating zone 100.

Contacting area 200: It may be advantageous for the heating element 1 to have at least one contacting area 200, by means of which contact is made with the heating zone. The heating element described here has two contacting areas located on opposite sides of the heating zone 100, approximately parallel to one another, with the heating zone 100 sandwiched between them.

Electrode 4: The heating element 1 features at least one electrode 4 for supplying electric current to at least one of the heating conductors 2. Here, two electrodes 4 are provided, one running along each of the contacting areas 200. They may be of an essentially meandering nature, and/or, as here, run in a straight line.

Contact conductor 3: At least one of the electrodes 4 has at least one contact conductor 3. This may have, for example, at least one substantially metallic electrical conductor strand 30, preferably of copper or a copper alloy, which is preferably provided at least partially with a coating of a non-oxidizing or passified metal, preferably of silver or a silver alloy. In the embodiment, a silver-coated copper strand is provided. This reduces the price of the heating element because conventional metallic strands can be used for the contacting conductors.

Connection with contact conductor/electrode: At least one contact conductor 3 and/or one electrode 4 is expediently connected electrically with a plurality of heating conductors 2. In the embodiment, all the contact conductors 3 are in contact with all the heating conductors 2.

Similar contact surfaces: It may be advantageous for at least one heating conductor 2 and at least one contact conductor 3 to have surfaces that are at least partially of a similar material. Here, they are both coated with silver. As a result, the contact resistances between the two conductor types are reduced. The term "similar" means here that the objects concerned have similar or substantially the same values or qualities, at least in respect of their functional properties, in particular their specific electrical conductivity.

Few contact conductors: It may be advantageous if, as in the embodiment, at least one electrode 4 has a maximum of two contact conductors 3, preferably a maximum of one contact conductor 3. This permits a reduction in material costs without increasing the contact resistances between the heating and contact conductors. The reason for this is that the flexibility of the heating conductors 2 and the low contact resistance between the heating conductors 2 and the contact conductor 3 result in a very low resistance at their contact surfaces. A duplicated arrangement of contact conductors 3 is therefore unnecessary.

Non-conducting zones in the projecting area 108: The heating element 1 may have at least one projecting area 108 in which at least parts of electrical conductors 25 are disposed, through which, however, no current flows during operation. Such projecting areas 108 are actually superfluous, but are sometimes unavoidable for production reasons. In the embodiment, one such projecting area is disposed alongside each of the contacting areas 200, on the side opposite the heating zone 100. It may therefore be advantageous for the heating element 1 to feature non-conducting zones 110 containing at least parts of electrical conductors 25, whose electrical conductivity is at least less than in other areas but preferably zero, said non-conducting zones preferably being located in the projecting areas 108 or in the area of a seat's trench transitions. This is achieved by way of selectively damaging, in advance, the electrical conductors 25, preferably the heating conductors 2, in these zones 110. By doing this, the undesirable or accidental flow of a heating current in trench transition areas or areas not to be heated can be prevented.

Connection line 6: Provision is made for the heating element 1 to have at least one connection line 6 in order to supply current from a current source 70, via at least one electrode 4, into the heating element 1.

Temperature sensor 80: It is useful for the heating element to additionally feature a temperature sensor 80 that interrupts a current supply to the heating element 1 at temperatures between 60° C. and 80° C. These values are averaged over a certain surface area and are therefore always lower than the temperature of the heating conductors 2. In spite of this, the temperature generated at the heating conductors themselves does not exceed 200 to 230° C. The temperature sensor 80 may be part of a thermostat, as in the embodiment, Electric cut-out 300: Provision is furthermore made for the heating element 1 to have at least one electric cut-out 300 that interrupts the operating current in the event of a malfunction. In the embodiment, the cut-out 300 is a fuse formed by a heating conductor 2, which, if a threshold temperature is exceeded, melts and conducts no more current.

Operational state: During operation, current flows from the current source 70 via a connection line 6 and the one electrode 4 into the plurality of heating conductors 2. The direction of current flow is thus within the plane of the heating element (and not perpendicular thereto). The heating conductors 2 warm up and heat the heating zone 100. From there, the current then flows via the other electrode 4 and the second connection line 6 back to the current source.

Electrical conductor 25: FIGS. 2 and 3 show an electrical conductor 25, which may be used for a heating element 1. The electrical conductor 25 may be, for example, a heating conductor 2, a contact conductor 3, an electric cut-out 300 and/or a connection line 6.

Heat-sensitive conductivity: It may be advantageous for the electrical conductivity of at least one electrical conductor 25 to be at least temporarily reduced if its temperature, at least locally, is between 200° C. and 400° C., preferably between 220° C. and 280° C. By this means, the heating element's surroundings can be prevented from heating up to an impermissibly high temperature even if the heating element's thermostat should fail, e.g. due to age-induced welding of the switching contacts, incorrect installation of the heating element, or to short-circuiting of the thermostat via heating conductors. It may be advantageous for at least part of, preferably substantially all of, the electrical conductor 25 to be interrupted, preferably irreversibly, within the cited temperature range. The heating element will then destroy itself before any fire risk for the surroundings can arise. Unintentional short circuits in the heating element, caused, e.g. by wires in the seat's trench zones, are remedied automatically by localized self-destruction of the heating element. Localized overheating, due, for example, to the formation of folds in the heating element on account of shifting, or faulty installation in the seat, again does not cause excessively high, impermissible seat temperatures thanks to localized self-destruction. After all, the materials surrounding the heating element, such as foamed cushions or fabric covers, are only at risk of catching fire as from temperatures above 270° C.

Electrical conductor 25 with conductor support 12 and conductor layer 14: It is to advantage if at least one electrical conductor 25 has at least one conductor support 12 and, in contact therewith, an electrically conductive conducting layer 14. Both could extend in several dimensions. However, they preferably run in essentially two, or, as here, one main direction.

Conductor 25 with conductive particles in matrix: It may be to advantage, either as an alternative or in addition, if at least one electrical conductor 25 has at least one conductor support 12, in particular a matrix, in which support electrically conductive particles are embedded. A matrix is a material in a composite and has other components embedded in it. The term particles, as used here, includes fibers. It is preferable for at least some of the particles to be granules or fibers composed of carbon, steel or other metals. Fibrous particles are especially suitable, as they enhance electrical conductivity when embedded in a matrix. Carbon nanotubes, graphite nanofibers or carbon filaments are particularly suitable. This ensures good electrical conductivity, mechanical sturdiness and corrosion resistance of the conductor support material, and makes it easy to spin. The conductor support 12 is preferably strand-shaped, in particular filamentary, and is preferably spun.

CNT: Carbon nanotubes (CNT) are tube-shaped carbon structures. The diameter of the tithes is usually in the range from 1-50 nm. Individual tubes currently reach lengths of millimeter magnitude. Depending on the structure, the electrical conductivity of the tubes is metallic, semi-conducting, or, at low temperatures, super-conducting. CNTs have a density of 1.3-1.4 g/cm$^3$ and a tensile strength of 45 billion Pa. The current carrying capacity is approximately 1,000 times that of copper wires. The heat conducting capacity is 6000 W/(m·K) at room temperature.

Graphite nanofibers: Graphite nanofibers are (solid) carbon fibers which, compared with customary carbon fibers (diameter approximately 10 μm), are some 10-100 times thinner.

Heat-sensitive conductor support and conducting layer: The conductor support 12 is preferably designed in such manner that it loses its material cohesion when a certain temperature is exceeded. To this end, it may be advantageous for the conductor support 12 to be made of a material that decomposes chemically or vaporizes as soon as certain temperatures are exceeded, so that it at least partially disintegrates or becomes interrupted. In consequence, the supporting structure for the conducting layer 14 becomes ineffective as soon as the temperature rises impermissibly. It may be advantageous for the conductor support 12 to shrink, contract and/or tear, in so doing destroying/tearing the overlying conducting layer; the conductivity of the conducting layer is destroyed as a result. It may be advantageous in this context for the conductor support 12 to be manufactured, at least partially, from a material with a memory effect.

Heat-resistant conductor support material: It may be advantageous, up to temperatures of at least 150° C., preferably at least 200° C., preferably at least 250° C., for the material of the conductor support 12 to retain its chemical and/or mechanical stability to a degree that at least resembles its stability under standard conditions. The material is thus sufficiently temperature-stable for the normal heating operation. Temperature-stable means that under the influence of everyday temperature fluctuations, the material concerned undergoes no, or, at the most, unsubstantial, change in shape or strength, remains chemically stable and retains the same physical condition as under standard ambient conditions.

Heat-fusible conductor support material: It may be advantageous for the conductor support to melt or soften at temperatures between 200° C. and 400° C., preferably between 250° C. and 300° C., preferably between 265° C. and 275° C., here at 270° C. Timely interruption of the heating conductor in the event of impermissible overheating is thereby guaranteed.

Sturdy conductor support: It may be advantageous for the conductor support 12 to be manufactured at least partially from a—preferably elastic and tear-resistant—plastic, preferably at least partially, but more preferably completely, from carbon fibers, polypropylene, polyester and/or glass fiber, and/or at least partially from steel, and/or for the material of the conductor support 12 to have a higher flexural fatigue strength and/or a lower tensile or compression strength than the material of the conducting layer 14. The term plastic refers to every synthetic, non-naturally occurring material, in particular polymers and substances derived therefrom, such as carbon fibers.

Thermoplastic conductor support material: It may be advantageous for at least part, substantially all, of the heating conductor's conductor support to be formed from a thermoplastic material, preferably from a plastic, preferably polyamide, polyester, Kapton or, as here, polyimide. This permits a cost-effective assembly. Moreover, fibers of this kind are soft and neither pointed nor brittle. Neighboring systems (e.g. seat-occupied recognition) can be safely operated as a result, and it is much easier to prevent penetration of the seat surface than with carbon fibers.

Thin conductor support: It may be advantageous for the material of the conductor support 12 to be less than 500 μm thick, preferably between 100 μm and 2 μm, preferably between 50 and 15 μm.

Thin conductor strands: It may be advantageous for the material of the conductor support 12 to be spinnable or capable of being drawn (out) into filaments or wires, preferably to filaments which are less than 100 μm thick, preferably less than 10 μm, preferably less than 1 μm, preferably less than 0.1 μm, preferably less than 0.01 μm. Here, provision is made for filaments that are 10 μm thick. The heating conductor is accordingly thin, while thanks to a large number of individual strands it also shows high stability and high electrical conductivity.

Integral connection between conducting layer and conductor support: Preferably, there is a material connection between the conducting layer 14 and the conductor support 12, thus ensuring that the conductor support and the conducting layer are securely coupled.

Metallizable conductor support: For this purpose, it may be advantageous for the conductor support 12 to be metallizable. Heating conductors of this kind are cost-effective in production. The term "metallizing" refers to the application of a metallic coating, e.g. by means of electroplating or sputtering.

Thin conducting layer: It may be advantageous for the conducting layer 14 to have a thickness essentially between 1 nm and 15 μm thick, preferably between 1 nm and 1 μm, preferably between 20 nm and 0.1 μm. Reliable interruption of the current in the event of a malfunction is thereby ensured, because a deformation of at least part of the conductor support 12 in the event of an impermissibly high operating current will at least partially destroy the conducting layer 14.

Conducting layer of amorphous material: It may be advantageous for the conducting layer 14 to be applied to the conductor support 12 by electroplating, as here, or by sputtering or a painting technique. These methods permit the build-up of uniform layers.

Conductor surface inert, treated against corrosion, only very slightly reactive, or of such nature that it generates electrically conductive corrosion products: It may be advantageous, under normal ambient conditions, for the conducting layer 14 and/or at least parts of the surface of at least one conductor 25 to be chemically inactive, at least on the exterior (with respect to the internal strand). The term "chemically inactive" means inert, (i.e. even under the influence of corrosive substances, the object referred to as chemically inactive undergoes no change, at least not under the influence of such substances as perspiration, carbonic acid or fruit acids. The material selected may also be of such kind that it either does not corrode or forms electrically conductive corrosion products. To this end, a metal may be provided whose surface can be passified and/or is oxidized and/or chromated. Precious metals such as gold or silver are particularly suitable for this purpose. Here, provision is made for at least part of the surface of one conductor 25 to be formed of a metal-containing material, preferably to be formed at least partially of nickel, silver, copper, gold and/or an alloy containing these elements, preferably to be formed almost completely of one of the materials mentioned. This reduces the contact resistance at the contact surface between heating and contact conductor.

Coated conducting layer: It may be advantageous for the surface of the conducting layer 14 to be at least partially coated, in particular with a plastic and/or a lacquer and/or, at least partially, with polyurethane, PVC, PTFE, PFA and/or polyester. In these embodiments, the electrical conductors 25 of the heating element 1 are particularly corrosion-resistant and can, moreover, be bonded by means of the coating.

Conductor strand 30: It may be advantageous for at least one electrical conductor 25 to have at least one conductor strand 30, as is the case here. A conductor strand is a strand encompassing one, several or many filamentary electrical conductors. Preferably, these run substantially in the longitudinal direction of the strand. A conductor strand may itself, as here, be built up from a number of conductor strands.

Strand and filament: A strand is a longish structure whose longitudinal dimensions by far exceed its cross-sectional dimensions. Preferably, the two cross-sectional dimensions are approximately the same size. The structure preferably has bending-elastic properties, but is in a solid state. The term filamentary as used here means that the object thus designated is made of a short or long fiber, or of a mono- or multi-filament thread.

Many individual strands and bundles of strands: It may be advantageous for at least one conductor strand 30 to feature a plurality of individual strands 33, preferably between 1 and 360, preferably between 10 and 70. In the embodiment described, the heating conductors 2 are configured with approximately 60 individual strands 33. This ensures that if one or the other individual strand 33 should fail, e.g. as a result of the stitching over process, the heating conductor 2 remains functional. Here, in addition, a plurality of individual strands 33 is combined to form at least one bundle of strands 32 so as to increase the stability of the conductor strand 30. Several bundles of strands 32, preferably between 1 and 20, preferably between 2 and 5, are then combined to form a collective bundle 31. Here, provision is made for 2 bundles of strands. A conductor strand 30 of this kind has a large surface area and low resistance, although much of the conductor-strand's cross section consists of a non-conducting material.

Thin individual strands: It may be advantageous for the individual strand 33 and/or the conductor strand 30 to be less than 1 mm thick, preferably less than 0.1 mm, preferably less than 10 μm. On account of the low mass of the heating conductor and the conducting layer, and of the resulting high rate of their destruction, the heating conductor's surroundings remain completely uninfluenced.

Support strands: It may be advantageous for a conductor strand 30 to have at least two different types of individual strands 33 and/or conductor bundles 32. Provision may be made for these to comprise different materials and/or to have different dimensions. It is preferable, as is the case here, to provide individual strands 570 that take up a large proportion of the mechanical load acting on the conductor strand 30. The support strands are preferably made of a material that is stronger, less elastic and able to support higher loads than the material of the other strands, e.g. substantially of polyester or steel, as here. Depending on the application, they are preferably also thicker and more numerous than the other strands. Thin conductor strands can be protected effectively in this way against bending and tensile stresses.

Functional components made of the same material(s): It may be advantageous for the conducting layer, the conductor support, the supporting conductors, the contact conductors and/or the heating conductors to be made substantially of the same material(s), preferably of one of the plastics cited. This facilitates recycling disused heating elements.

Twisted strands: It may be advantageous for the conductor strand 30 and/or at least one individual strand 33 to feature a preferably spiral-shaped spatial configuration, obtained preferably by twisting, twining or braiding them with one another. This produces heating conductors of particularly high tensile strength.

Covering layer: It may advantageous for at least sections of a plurality of individual strands 33, strand bundles 32 and/or conductor strands 30 to be electrically insulated from one another, preferably in that at least one individual strand 33 is at least partially insulated by means of an insulation layer on its conducting layer 14. This safeguards the heating element additionally against localized overheating.

Adhesive-coated conductor strands: Provision may also be made for at least sections of at least one conductor strand 30 and/or individual conductor 33 to be coated with an adhesive, in particular a heat-activatable adhesive. This permits easy assembly of the heating element.

Internal strand 34 and coating layer 35: As illustrated here in FIG. 3, the electrical conductor 25 may feature at least one filamentary internal strand 34 as conductor support 12, and, at least partially encasing this internal strand 12, at least one electrically conductive coating layer 35 as conducting layer 14. A coating layer is a layer which, directly or indirectly, encases at least part of a strand but is not necessarily the outermost layer encasing the strand.

Conductor weight, coating share and precious-metal share low: It may be advantageous for the electrical conductor 25 to weigh between 5 and 50 g/km, in particular between 10 and 15 g/km. It advantageously features a metallic share of between 0.1 g and 10 g, preferably between 1 g and 5 g, preferably between 1 and 3 g per km. In particular, it may be advantageous for the electrical conductor 25 to have a precious-metal share, preferably silver, of between 10 wt. % and 50 wt. %, preferably between 15 wt. % and 25 wt. %.

Textile-integrated conductor: It may be advantageous for at least sections of at least one electrical conductor 25 to be arranged, anchored and/or integrated in contact with and/or in the element support 8 of the heating element 1. It may be advantageous for at least one electrical conductor 25, preferably as heating conductor 2 or contact conductor 3, to be integrated at least in parts of the element support 8, preferably in the weft, part-weft or as warp thread, for it to be laid thereupon and anchored by means of an additional sewing or knitting thread, for it to be integrated therein as sewing thread, and/or for it to be bonded thereto and/or stuck between two layers of the element support 8. It is preferably integrated during production of the heating element 1, e.g. as weft thread in a multiple-thread knitted fabric, as here. This simplifies the production process. A heating element of this kind is easy to install, since the conductor strands for supplying electrical energy and/or for heating, and/or the conductor strands of the additional conductor, can be made up in advance, for example as strip or continuous material, and, for example, then only need to be ironed on.

Resistance largely independent of temperature: Preferably, at least one heating conductor 25, one conductor strand 30 and/or at least one conducting layer 14 has an electrical resistance which, within a certain temperature range, fluctuates by a maximum of 50% of its resistance at room temperature (approx. 20° C.). The fluctuation is preferably even less, preferably a maximum of 30%, ideally a maximum of 10%. The defined temperature range preferably includes temperatures from −10° C. to +60° C., preferably −20° C. to +150° C., ideally −30° C. to +200° C. This resistance can be set, for example, by standard methods such as pre-stretching of the heating conductors (e.g. by 10% of their original length), intermittent storage (e.g. 72 hours) of the heating conductors at elevated temperatures (e.g. 50° C.), by supplying water (e.g. water bath at 30° C. for 2 hours), or other suitable methods.

Installation possibilities: It may be advantageous to install the heating element in a vehicle seat, a steering wheel, an armrest, a seat pad, an electric blanket, or the like. FIG. 4 shows a heating clement installed in a seat 500. The heating element may be located in a seat insert or, as here, between the trim surface and the seat cushion. It may be advantageous to fit the heating element into a larger sub-system that provides the seat occupant with heating, cooling, ventilation, etc.

Potential applications in combination with other patents: It may be advantageous to use the heating element described here as an additional component of known systems or as a substitute for one or more of the components of such systems. For example, the heating element can be added to the seats described in the U.S. Pat. Nos. 6,786,541; 6,629,724; 6,840,576; 6,869,140 and the applications and patents connected therewith, or to the seats described in the US patent application 2004-0189061. The heating element can additionally be used in combination with the seats described in the U.S. Pat. Nos. 6,893,086; 6,869,139; 6,857,697; 6,676,207; 6,619,736; 6,604,426; 6,439,658; 6,164,719; 5,921,314 and related applications and patents, or the US patent applications 2005-0323950; 2005-0331986; 2005-0140189; 2005-0127723; 2005-0093347; 2005-0085968; 2005-0067862; 2005-0067401; 2005-0066505; 2004-0339035 and related applications. All the cited patents and patent applications are herewith included, by way of reference thereto, as part of this document.

Seat with air movement means: It may be advantageous for the seat system to include at least one seat portion or backrest, armrest, cushion or similar component featuring a cushion, an insert for altering the temperature, and a trim surface. An air movement means may be provided for supplying the seat with conditioned or ambient air that may be used to heat or cool the seat or seat occupant convectively or conductively.

Seat with insert: It may also be advantageous to blow temperature-controlled air through a permeable trim surface from the seat cushion over the user, thereby providing the seat and seat occupant with convective, heating or cooling. As is shown in the U.S. Pat. Nos. 6,869,139 and 6,857,697, the cushion may be, provided with a passageway for the transmission of temperature-controlled air through the insert to the seat surface. A diversity of other optional features that are disclosed in these patents may be incorporated into the seating systems of the invention described here, for example tunnels, sub-passageways, deflectors, air-impermeable covers or coatings, or the like. For example, an intermediate layer with through holes may be located above the sub-passageways or tunnels in order to moderate the air current or direct it at the seat occupant. A heating element may be used to provide heat. A certain degree of conductive cooling may likewise be achieved through use of this system.

Cooling with ambient air: The temperature-controlled air may, however, also be combined with ambient air that is sucked over the seat occupant and into the seat. In this case, ambient air is sucked through the trim surface and into a mixing area beneath the trim surface, where the ambient air is combined with the air that has been conditioned temperature-wise. The mixed air is then transported away from the seat, either to be discharged or to be transported back to the evaporator and/or the mixing area. The ambient air provides convective cooling (or heating), while the air that is conditioned temperature-wise provides conductive cooling or heating. The mixing area may, for example, be an open space incorporated within an intermediate layer. Examples of seats with mixing areas are contained in the US patent applications 2005-0067862 and 2005-0066505

Connection with the on-board air-conditioning system: Temperature-controlled air may be generated by means of a connection to the vehicle's on-board air-conditioning system, by means of a closed-circuit system, or by a combination of systems. Closed-circuit systems comprise such systems as are not connected to the vehicle's on-board air-conditioning system. These may include thermoelectric devices, absorption cooling systems or components, heating elements and combinations of these.

Sub-surface airflow: It may be advantageous to supply temperature-controlled air to the insert without blowing the air over the seat occupant. For example, through use of an air-impermeable trim surface, temperature-controlled air can be supplied to an insert provided with an open space located beneath the impermeable trim surface. Air is blown or sucked into the insert in order to conductively heat or cool the insert and hence the seat occupant.

Opposite current directions side by side: It may be advantageous for at least some of the heating conductors and/or contact conductors to be mutually superposed over at least part of their length or to run at least approximately alongside each other, and for the current flowing in them to flow, at least over part of their length, in opposite directions. In this way, the electromagnetic fields generated by the conductors can be compensated.

Folded heating element: To this end it is advantageous for the heating element to be folded, at least section-wise. In the embodiment, this is effected along a fold 52 that is approximately equidistant from each of the two electrodes 4 and approximately parallel thereto. This results in the two electrodes 4, with opposing flow directions, being located one above the other. The two halves of the heating conductor, which are created by the fold 52, are also mutually superposed and have the current flowing in opposite directions.

Exemplary nature of the embodiments: The embodiments described above are intended to elucidate the invention. However, they are only of exemplary nature. It goes without saying that individual features can also be omitted, modified or supplemented. The features of different embodiments may also be combined with each other.

What is claimed is:

1. A heating element for heating user-contacted surfaces of a passenger compartment of a vehicle, comprising:

one or more electrical conductors including at least one strap wherein an electrical conductivity of least one of the one or more one electrical conductors is irreversibly reduced by at least localized self destruction if the temperature thereof at least locally exceeds a permissible maximum temperature.

2. The he lemon according to claim 1,wherein the permissible maximum temperature is 280° C.

3. The heating element according to claim 1, wherein the one or more one electrical conductors are disposed on a conductor support, further wherein the conductor support loses its material cohesion when the permissible maximum temperature is exceeded.

4. The heating element according to claim 3, wherein the permissible maximum temperature is 280° C.

5. The heating element according to claim 3, wherein the permissible maximum temperature is 220° C.

6. The heating element according to claim 3, wherein the conductor support has a thickness between 20 nm and 0.1 μm.

7. A heating element for heating user-contacted surfaces of a passenger compartment of a vehicle, comprising:

one or more electrical conductors disposed on a conductor sup ort and including at least one strand, wherein an electrical conductivity of at least one of the one or more one electrical conductors is irreversibly reduced by at least localized self destruction if the temperature thereof at least locally exceeds a permissible maximum temperature of at most 280° C.

8. The heating element according to claim 7, wherein the conductor support loses its material cohesion when the permissible maximum temperature is exceeded.

9. The heating element according to claim 7, wherein the permissible maximum temperature at most 220°C.

10. A heating element for heating user-contacted surfaces of a passenger compartment of a vehicle, comprising:

one or more electrical conductors disposed on a conductor support and in at least a strand, wherein an electrical conductivity of at least one of the one or more one electrical conductors is irreversibly reduced by at least localized self destruction if the temperature thereof at least locally exceeds a permissible maximum temperature or if a heating current exceed a permissible current load; and wherein the conductor support loses its m cohesion if the temperature there of at least locally exceeds the permissible maximum temperature thereby destroying conductivity of at least one of the one or more electrical conductors.

11. The heating element according to claim 10 wherein the permissible maximum temperature is 280° C.

12. The heating element according to claim 10, wherein the permissible maximum temperature is 220° C.

13. The heating element according to claim 1, wherein a heating current is distributed to neighboring electrical conductors upon the localized self destruction.

14. The heating element according to claim 13, wherein all of the electrical conductors are irreversibly reduced by self destruction if the heating current exceeds a permissible current, load.

15. The heating element according to claim 1, wherein substantially all of the electrical conductors are irreversibly reduced by self destruction if the average temperature surrounding the heating element exceeds a permissible maximum temperature.

16. The heating element according to claim 1, wherein the at least one or more strands form at least one bundle of strands so if the at least one or more strands should fail, the electrical conductor remains functional.

17. The heating element according to claim 10, wherein the permissible maximum current load is 100 mA at an operating voltage between 10 V and 50 V.

18. The heating element according to claim 1 wherein the heating current is distributed to neighboring electrical conductors upon the localized self destruction.

19. The heating element according to claim 10, wherein the at least one or more strands form at least one bundle of strands so if the at least one or more strands should tail, the electrical conductor remains functional.

20. The heating element according to claim 10, wherein the conductor support has a thickness between 20 nm and 0.1 μm.

* * * * *

UNITED STATES PATENT AND TRADEMARK OFFICE

CERTIFICATE OF CORRECTION

PATENT NO. : 8,525,079 B2
APPLICATION NO. : 13/204152
DATED : September 3, 2013
INVENTOR(S) : Michael Weiss It is certified that error appears in the above-identified patent and that said Letters Patent is hereby corrected as shown below:

On the Title Page
References Cited, page 2, Item (56) OTHER PUBLICATIONS insert the following references:
--Co-pending application, Serial No. 11/085644, Filed March 31, 2005, now U.S. Patent No. 7,205,510 (1139.024)
Co-pending application, Serial No. 11/776,869, Filed July 12, 2007, published as 2008/0010815 (1139.063)
Co-pending application, Serial No. 11/842,540, Filed Aug. 21, 2007, published as 2008/0047733 (1139.067)
Co-pending application, Serial No. 09/642,167, Filed Aug. 18, 2000, now U.S. Patent No. 6,686,562 (1063.001)
Co-pending application, Serial No. 10/598,453, Filed Mar. 4, 2005, published as 2007/0278214 (1063.006)
Co-pending application, Serial No. 11/800,669, Filed May 7, 2007, published as 2007/0257027 (1063.010)
Co-pending application, Serial No. 11/803,486, Filed May 15, 2007, published as 2007/0278210 (1063.011)--

In the Claims
Claim 1, column 10, line 66, delete “strap” and insert --strand,--
Claim 10, column 12, line 1, delete “m” and insert --material--
Claim 10, column 12, line 2, delete “there of” and insert --thereof--
Claim 11, column 12, line 6, insert --,-- between “10” and “wherein”
Claim 19, column 12, line 35, delete “tail”, insert --fail--

Signed and Sealed this
Third Day of June, 2014

Michelle K. Lee

Michelle K. Lee
*Deputy Director of the United States Patent and Trademark Office*

UNITED STATES PATENT AND TRADEMARK OFFICE

CERTIFICATE OF CORRECTION

PATENT NO. : 8,525,079 B2
APPLICATION NO. : 13/204152
DATED : September 3, 2013
INVENTOR(S) : Michael Weiss It is certified that error appears in the above-identified patent and that said Letters Patent is hereby corrected as shown below:

On the Title Page
References Cited, page 2, Item (56) OTHER PUBLICATIONS insert the following references:
--Co-pending application, Serial No. 11/085644, Filed March 31, 2005, now U.S. Patent No. 7,205,510 (1139.024)
Co-pending application, Serial No. 11/776,869, Filed July 12, 2007, published as 2008/0010815 (1139.063)
Co-pending application, Serial No. 11/842,540, Filed Aug. 21, 2007, published as 2008/0047733 (1139.067)
Co-pending application, Serial No. 09/642,167, Filed Aug. 18, 2000, now U.S. Patent No. 6,686,562 (1063.001)
Co-pending application, Serial No. 10/598,453, Filed Mar. 4, 2005, published as 2007/0278214 (1063.006)
Co-pending application, Serial No. 11/800,669, Filed May 7, 2007, published as 2007/0257027 (1063.010)
Co-pending application, Serial No. 11/803,486, Filed May 15, 2007, published as 2007/0278210 (1063.011)--

In the Claims
Claim 1, column 10, line 66, delete "strap" and insert --strand,--
Claim 2, column 11, line 4, delete "The he lemon" and insert --The heating element--
Claim 7, column 11, line 19, delete "sup ort" and insert --support--
Claim 9, column 11, line 29, insert --is-- between "temperature" and "at"
Claim 10, column 11, line 33, delete "support and in at least a strand," and insert --support and including at least one strand,--

This certificate supersedes the Certificate of Correction issued June 3, 2014.

Signed and Sealed this
Twenty-second Day of July, 2014

Michelle K. Lee

Michelle K. Lee
*Deputy Director of the United States Patent and Trademark Office*

Claim 10, column 11, line 38, delete “exceed” and insert --exceeds--
Claim 10, column 12, line 1, delete “m” and insert --material--
Claim 10, column 12, line 2, delete “there of” and insert --thereof--
Claim 11, column 12, line 6, insert --,-- between “10” and “wherein”
Claim 14, column 12, lines 16-17, delete “,” between “current” and “load”
Claim 19, column 12, line 35, delete “tail”, insert --fail--